(12) United States Patent
Mitchell et al.

(10) Patent No.: US 9,391,881 B2
(45) Date of Patent: Jul. 12, 2016

(54) SYSTEM AND METHODS FOR DYNAMIC NETWORK ADDRESS MODIFICATION

(71) Applicants: Gary Mitchell, Woodbine, MD (US); Scott Whittle, Olney, MD (US); Kurt Quasebarth, Baltimore, MD (US)

(72) Inventors: Gary Mitchell, Woodbine, MD (US); Scott Whittle, Olney, MD (US); Kurt Quasebarth, Baltimore, MD (US)

(73) Assignee: IP Technology Labs, LLC, Olney, MD (US)

( * ) Notice: Subject to any disclaimer, the term of this patent is extended or adjusted under 35 U.S.C. 154(b) by 94 days.

(21) Appl. No.: 14/185,395

(22) Filed: Feb. 20, 2014

(65) Prior Publication Data

US 2014/0317312 A1 Oct. 23, 2014

Related U.S. Application Data

(60) Provisional application No. 61/767,229, filed on Feb. 20, 2013.

(51) Int. Cl.
| | | |
|---|---|---|
| *H04L 12/717* | (2013.01) | |
| *H04L 12/721* | (2013.01) | |
| *H04L 12/725* | (2013.01) | |
| *H04L 29/06* | (2006.01) | |
| *H04L 29/12* | (2006.01) | |

(52) U.S. Cl.
CPC .............. *H04L 45/42* (2013.01); *H04L 45/306* (2013.01); *H04L 61/2015* (2013.01); *H04L 63/0272* (2013.01); *H04L 61/1511* (2013.01); *H04L 61/2076* (2013.01); *H04L 61/2514* (2013.01)

(58) Field of Classification Search
None
See application file for complete search history.

(56) References Cited

U.S. PATENT DOCUMENTS

| | | | | |
|---|---|---|---|---|
| 8,423,631 B1* | 4/2013 | Mower | ................ | H04L 12/6418 709/223 |
| 8,892,766 B1* | 11/2014 | Wei | ..................... | H04L 67/2814 706/22 |
| 2003/0110288 A1* | 6/2003 | Ramanujan | ......... | H04L 63/0272 709/238 |
| 2005/0251856 A1* | 11/2005 | Araujo | .................. | H04L 63/123 726/12 |
| 2005/0262357 A1* | 11/2005 | Araujo | ................ | H04L 63/0227 713/182 |
| 2005/0273849 A1* | 12/2005 | Araujo | ................ | H04L 63/0428 726/12 |
| 2007/0061887 A1* | 3/2007 | Hoover | ............... | G06F 21/6218 726/26 |
| 2007/0104197 A1* | 5/2007 | King | .................... | H04L 63/0263 370/392 |
| 2009/0268605 A1* | 10/2009 | Campbell | ............... | H04L 41/12 370/216 |
| 2010/0191839 A1* | 7/2010 | Gandhewar | ....... | H04L 29/12028 709/220 |
| 2011/0154477 A1* | 6/2011 | Parla | ................... | H04L 63/0272 726/15 |
| 2013/0176988 A1* | 7/2013 | Wang | .................... | H04W 28/08 370/331 |
| 2013/0182651 A1* | 7/2013 | Kelkar | ................ | H04L 61/2038 370/329 |
| 2013/0182712 A1* | 7/2013 | Aguayo | ............. | H04L 12/4633 370/395.53 |
| 2013/0304796 A1* | 11/2013 | Jackowski | ............. | H04L 47/19 709/202 |

* cited by examiner

*Primary Examiner* — Ninos Donabed
(74) *Attorney, Agent, or Firm* — Kristin Mazany Nevins; Offit Kurman

(57) ABSTRACT

The invention presented herein permits split-routing to occur without any changes, modifications, or configuration of the requesting host, network stacks, network architectures and routing and forwarding behavior. The invention is carried out by way of a Module that intercepts the normal and standard DHCP communication between a requesting device and a DHCP server, and substitutes the elements within the server response with the Module's own predefined elements. These substitute elements leverage the behavior of standard protocols to gain desired device network behavior.

5 Claims, 7 Drawing Sheets

SYSTEM AND METHODS FOR DYNAMIC NETWORK ADDRESS MODIFICATION

RELATED APPLICATIONS

This patent application claims priority to U.S. Provisional Patent Application No. 61/767,229 filed on Feb. 20, 2013, the contents of which are hereby incorporated by reference in its entirety.

FIELD OF INVENTION

This application relates to the technical field of network communications; in particular, to Dynamic Host Configuration Protocol (DHCP) and network address modification.

BACKGROUND

In applications where there is a tunnel to a remote network it is often desirable to have traffic destined for the non-tunneled network to simply egress the local router towards the Internet. In typical VPN or Tunnel networks this is called a split-tunnel. Split tunneling is a computer networking concept which allows a VPN user to access a public network, e.g., the Internet, and a local LAN or WAN at the same time, using the same physical network connection. This connection service is usually facilitated through a program such as a VPN client software application.

In VPNs, there are basically two types of virtual tunnels that enable secure data transmission: full tunnels and split tunnels. In full tunnel mode, a remote user establishes an Internet connection from a client device, such as a PC, which then runs through the VPN. This naturally includes the user's private data traffic. As a result, every time the user scans the web, it is done through the VPN gateway.

For example, suppose a user utilizes a remote access VPN software client connecting to a corporate network using a hotel wireless network. The user with split tunneling enabled is able to connect to file servers, database servers, mail servers and other servers on the corporate network through the VPN connection. When the user connects to Internet resources (web sites, FTP sites, etc.,) the connection request goes directly out the gateway provided by the local network.

Usually, this network traffic behavior is accomplished via routing statements. But, in a transparent tunnel network architecture where there is no routing and a split-tunnel configuration would require manual configuration of all the network elements along the path.

Split tunneling has a variety of advantages. It only transmits data that actually requires the protection of a VPN, and it enables strict separation of corporate Internet traffic and private Internet use. Split tunneling manageability, however, depends on the quality of the implemented VPN components.

SUMMARY

The invention presented herein permits split-routing to occur without any changes, modifications, or configuration of the requesting host, network stacks, network architectures and routing and forwarding behavior. The invention is carried out by way of a Module that intercepts the normal and standard DHCP communication between a requesting device and a DHCP server, and substitutes the elements within the server response with the Module's own elements. These substitute elements leverage the behavior of standard protocols to gain desired device network behavior.

Existing methods known in the art require setup of multiple LAN servers and/or routers (network elements) each with their own connectivity information or modification to the hosts to make use of split-tunnel. There is no known automatic method for dynamic IP addressing schemes. Also, the fixed methods also are a waste of limited network resources. There are no known methods which provide selectivity on a host basis to force some hosts to be use the tunnel exclusively in a compulsory mode and others to use the split tunnel while coexisting on the same LAN.

Described herein is a method of substituting network addressing elements with predefined information, thereby managing the flow of network traffic as it seeks egress to an alternate network, comprising: presenting an interface for intercepting a reply to a devices-DHCP request; substituting the reply with predefined information; and enabling a split-tunnel; substituting an IP address of an issuing DHCP server with an IP address of a local terminal; and forwarding resulting traffic on from the local terminal to a predetermined interface based on a destination of that address.

Also described is a computer software product for use with a computer, said computer software product comprising, and a module constructed and arranged to be embedded into a computer program, wherein the module is operable to provide substitution addressing elements to a DHCP-requesting device.

Another embodiment of the present invention is a computer-readable storage medium storing an executable computer program module for enabling substituting network addressing elements, the module comprising: an intercept sub-module configured to manage DHCP information between networks; an elements sub-module configured to obtain and establish the network items to be substituted; and a substitution sub-module configured to perform the operations of deconstructing, substituting, and rebuilding packets with predefined information, thereby allowing the module to manage the flow of network traffic as it seeks egress to an alternate network.

Yet another embodiment of the present invention is a method to permit split-routing to occur without any changes, modifications or configuration of a requesting host, network stack, network architecture, and routing and forwarding behavior, the method comprising: presenting a module to intercept the normal and standard DHCP communication between a requesting device and a DHCP server, wherein the module is configured for substituting the elements within the server response with the module's own elements, thereby directing traffic through an alternate route.

The summary is an overview of the concept in a simplified form and not intended to identify essential features of the claimed subject matter, nor is it necessarily intended to be used as an aid in determining the scope of the claimed subject matter.

BRIEF DESCRIPTION OF THE DRAWINGS

The detailed description is described with reference to the accompanying drawings. In the drawings, the left-most digit of a reference number identifies the figure to which the reference number first appears.

DETAILED DESCRIPTION

Figure 1:
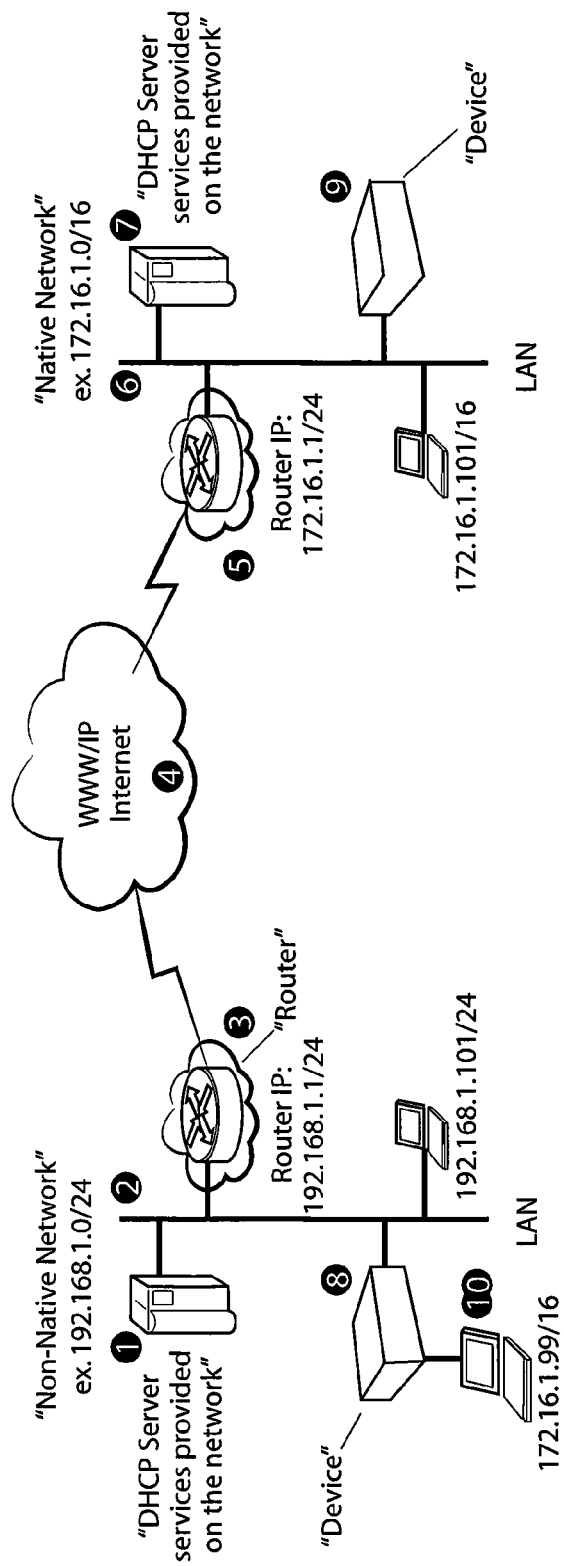
FIG. 1 shows an example communication environment in which the present invention can be implemented.

A network based device needs to have certain mandatory addressing and connectivity information in order to communicate on any network. On a local area network (LAN) this device will send out a query asking for this network connectivity information. A server on the LAN will respond with this information which is local to this LAN. In all cases, this addressing and connectivity information assumes that the network based device is local and would behave as a local device.

In situations where a compulsory (all traffic if forced) tunnel VPN or Tunnel is installed all of the remote network traffic from remote devices is sent to the headquarters network. When a network based device needs it connectivity information in this environment it will receive its addressing and connectivity query response—not from the local server—but the remote server at the headquarters. As such all network traffic from the remote site will traverse the tunnel even traffic not destined for use or processing by that network (compulsory tunneling). In many cases it is desired to have only the network traffic for the remote network traverse the tunnel whilst all non-remote network traffic (local traffic) automatically traverse via its local network connection. This is often called a split-tunnel where there are two different paths for flows to traverse. The present invention is designed to automatically enforce the split-tunnel behavior on networks with multiple DHCP servers.

In order to have specified devices (indicated in a list of specified devices in the process) or all devices on a network, at any time, be able to use this split-tunnel, the connectivity certain parameters must be modified prior to delivery to that host so that the desired information received by the device ensures its proper behavior of either compulsory or split-tunnel behavior.

When a VPN or Tunnel is installed a hosts' connectivity query will traverse the compulsory tunnel to the headend LAN. A server on this LAN will respond with connectivity information towards the querying remote host/devices for its local headend network. The invention will automatically substitute the appropriate parameters so that the querying host's behavior will automatically use the tunnel for remote traffic and the split-tunnel for non-remote network traffic.

The present invention does not require modification to the headend LAN server, the remote network, or the queried host/device.

Existing methods known in the art require setup of multiple LAN servers and/or routers (network elements) each with their own connectivity information or modification to the hosts to make use of split-tunnel. There is no known automatic method for having a single automatic address scheme across multiple networks and/or multiple gateways. Also, the fixed methods also are a waste of limited network resources. There not known methods which provide selectivity on a host basis to force some hosts to be use the tunnel exclusively in a compulsory mode and others to use the split tunnel while coexisting on the same LAN (layer-2 environment.)

Definitions

The following terms are used to describe different aspects of the invention and the environment in which the invention operates. These terms are used for explanation purposes only and are not intended to limit the scope for any aspect of the invention.

IP refers to Internet Protocol used for network communications.

IP Address refers to the unique address issued to hosts, devices applications and used for bi-direction or unidirectional communications between those hosts, devices, or applications.

Device or devices refer to any host, device or application that uses or makes use of IP for communications. End-point device or devices refer to some application or device that provides the ability to begin or end a tunnel.

Tunnel refers to the transparent bridged link between networks as provided by software.

A bridged-link creates a single logical network although not physically co-located.

Module refers to one particular embodiment of the invention, which refers to computer program logic for providing a specified functionality. One or more variations of the Module can be implemented in hardware, firmware, and/or software. The module is typically stored on a computer-readable storage medium such as the storage device, loaded into memory, and executed by a processor. Modules are referred to herein as S1, S2, S3, S4, S5, and the nomenclature is for illustrative purposes; other identification means could be assigned to the various Modules, such as M1, M2, and the like.

An interface refers to a point of logical or logical/physical connection. Typically, the term interface is used in reference to an Ethernet or Ethernet-like port. This reference assumes that the interface structures present an IP-based behavior posture.

A predetermined interface refers to either an automatic or manual configuration of the invention process to supply the desired information to the requesting host so that its traffic goes out the desired interface based on the traffic type offered.

A packet refers to binary data capable of being routed through a computer network. To improve communication performance and reliability, each message sent between two network devices is often subdivided into packets by the underlying hardware and software.

Illustrative Network Environment

The present invention works within a typical network configuration and operationally performs the task of substituting a default router from an issuing DHCP server with an IP address of a local terminal. This allows the local terminal to forward outgoing traffic to a specific interface (Internet or tunnel) based on the destination of the address.

Consider the following typical network drawing shown in FIG. 1, where each network is independent with its own DHCP server on its network. As used in this description, a device may take a variety of forms including, but not limited to, computing devices, mobile phones such as smart phones, tablet, desktop and laptop computers, media devices or any application or source operating on a processor such as mobile-phone application or various other applications as would be appreciated by those skilled in the art.

On each network, when a device attaches it will issue a DHCP request. If present, a DHCP server will respond with various network connectivity-information for the device. The basic information required for network connectivity include: an IP address and netmask; one or more DNS addresses; and a default gateway.

When a Tunnel is initiated it will request a DHCP address from the local network from where it is attached. For example, based on FIG. 1, Device 8 will obtain DHCP information from DHCP server 1; Device 9 will obtain DHCP information from DHCP server 7. When a tunnel is created between the end-point devices 8 and 9 the attached Device 10 obtains its address from the native network DHCP server (Device 7) with the information for its network.

Therefore, it may be desirable for some Device 10 users traffic not destined for the native network—via the tunnel—to simply egress the local router (Device 3) normally. But the DHCP information offered over the tunnel would force all Device 10's traffic to traverse the tunnel and egress via the native network's router (Device 6).

Therefore, in many instances, the traffic flow from Device 10 would normally be presented to network 2, and only to use the tunnel for traffic destined to network 6.

Employing the invention as described herein, Device 8 would intercept the DHCP communication destined for DHCP server 7, and substitute the proper network elements to facilitate the split-tunnel operation.

Networks represent any type of communication network, including wire-based (i.e., fiber optic, cable, etc.), wireless (i.e., cellular, WiFi, Bluetooth, etc) or combinations thereof.

Hosts represent any type of client or server computing device on the network. Each host may be configured to send and receive data. A host may be a dedicated server or router through which incoming or outgoing messages are routed on behalf of a client device, user, or application and use any suitable addressing protocol or layer.

A server generally represents a name server that hosts a network service such as providing response to queries against a directory service. This may include addressing components such as IP addresses, amongst others as would be recognized by one skilled in the art.

Hosts and server also represent any suitable computing device, which includes one or more processors and the ability to access a computer-readable media. Processors interact with computer-readable media to execute instructions that facilitate functionality of each router or server.

Processors may be distributed in more than one computer system and over a network. Computer readable media may include any suitable computer-storage media including volatile and non-volatile memory, removable and non-removable media and any combination thereof. In another embodiment, computer readable media may include communication media that may embody computer readable instructions, data structures, program modules, or other data in a modulated data signal.

Standard/Typical Behavior of Network Attached Devices on a Local Network

Figure 2:
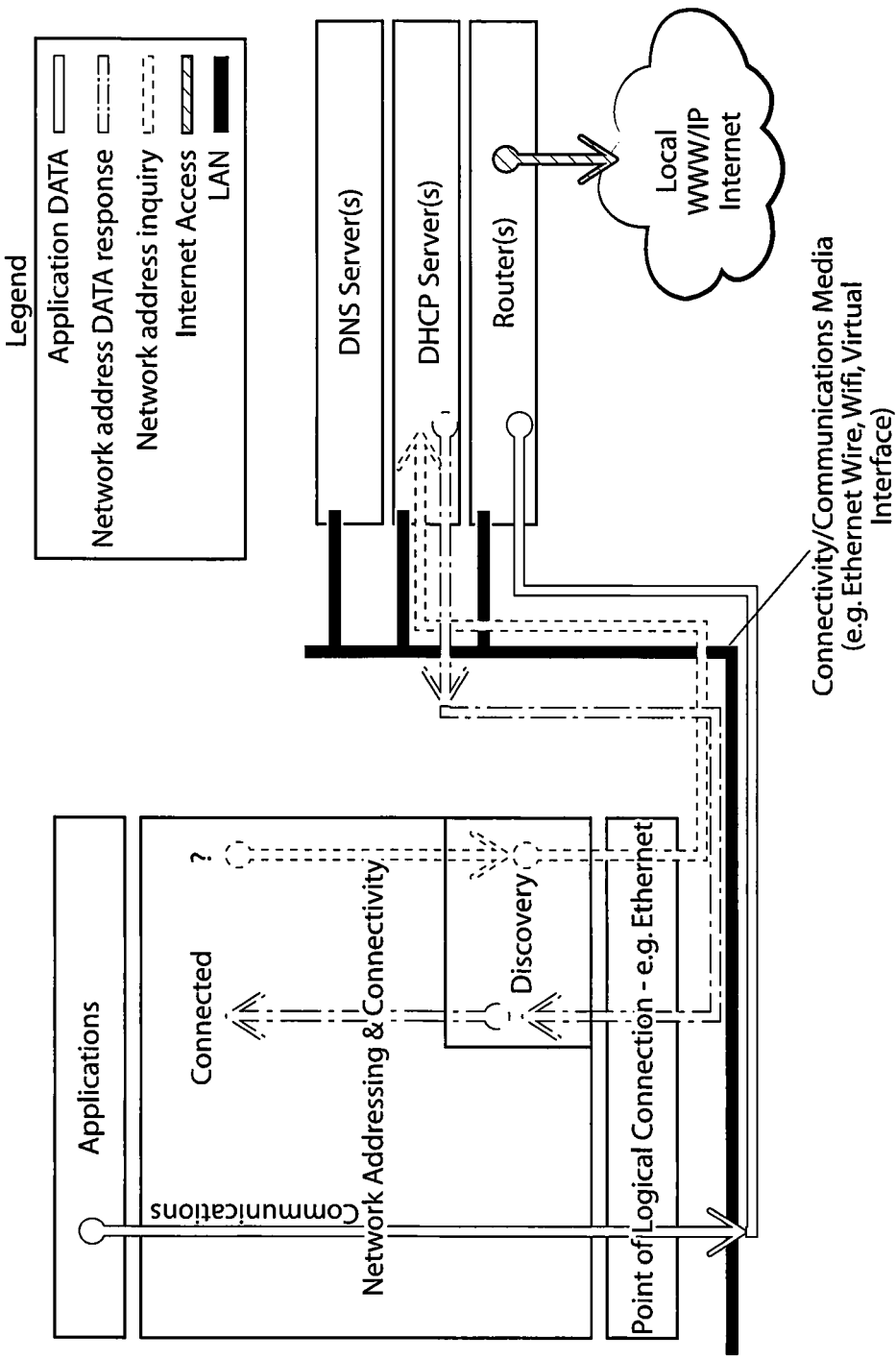
FIG. 2 shows an exemplary overview of behavior of a network-attached device on a local network (i.e., a non-tunnel network).

FIG. 2 shows a typical network when a device seeks to access the Internet. Within the operating firmware of a device or application there will be several functions attempting to establish the device on the network. In order to establish a device on the network the industry has standardized on the DHCP protocol to provide device/application connectivity information. Once a device has the basic information of a unique IP address, netmask, and at least one DNS address it can completely access any other Internet address anywhere in the world.

The networking and computing industry has standardized on DHCP as the preferred method for distributing connectivity information to devices which require and ask for this network connectivity information.

When a device wishes to establish network connectivity its firmware will transmit to an available connection (either physical or logical) a DHCP discovery request. As the device does not yet have any network information it sends this out as a broadcast to any listening DHCP server. A DHCP server is a preconfigured network service existing on the local network. As it is setup for the local network, any devices requesting this connectivity information will receive the appropriate information to properly function.

After the device is connected, or has its connectivity information, the applications are free to communicate with the Internet via local resources and services.

Network-based services are used to support devices, applications, etc. These services are accessed via a physical or logical connection point, however these services may be found all on a single machine. The arrangement does not affect operation.

Figure 3:
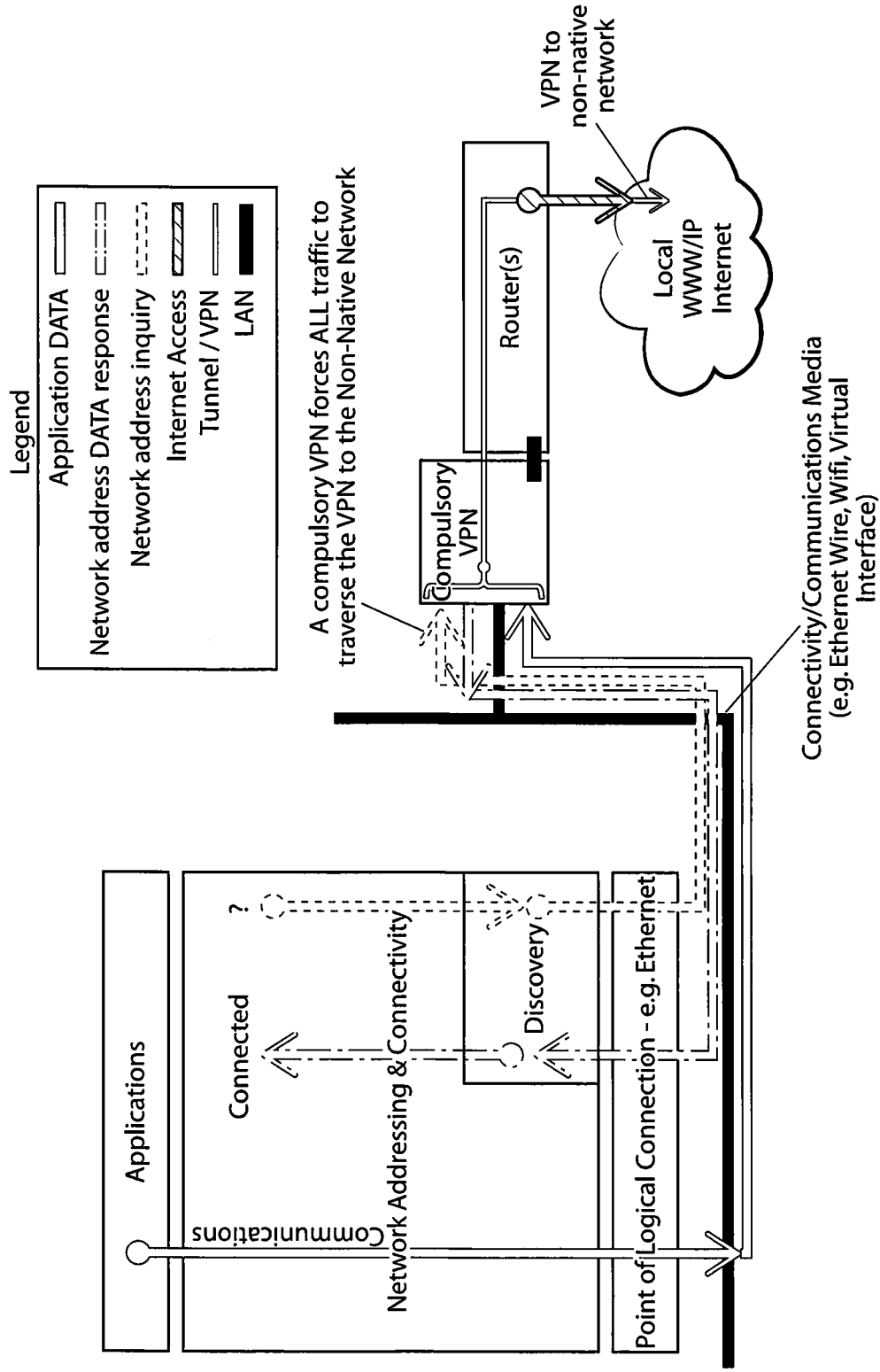
FIG. 3 shows an exemplary overview of behavior of network-attached devices when a compulsory VPN is activated.

Standard/Typical Behavior of Network Attached Devices when a Compulsory VPN is activated FIG. 3 shows a network where a compulsory VPN is implemented ALL traffic is forced to the non-native network. Thus, any devices/applications will communicate with the network services—not locally—but through the VPN. Additionally, all network based application traffic will traverse over the VPN even for traffic not required or destined for the non-native network.

Network Behavior Employing the Exemplary Module

When using the Exemplary Module, traffic ONLY destined for the non-native network will traverse the tunnel. This is called a split-tunnel. The key advantage of the Exemplary Module is that the Module can operate automatically without pre-configuration.

Figure 4:
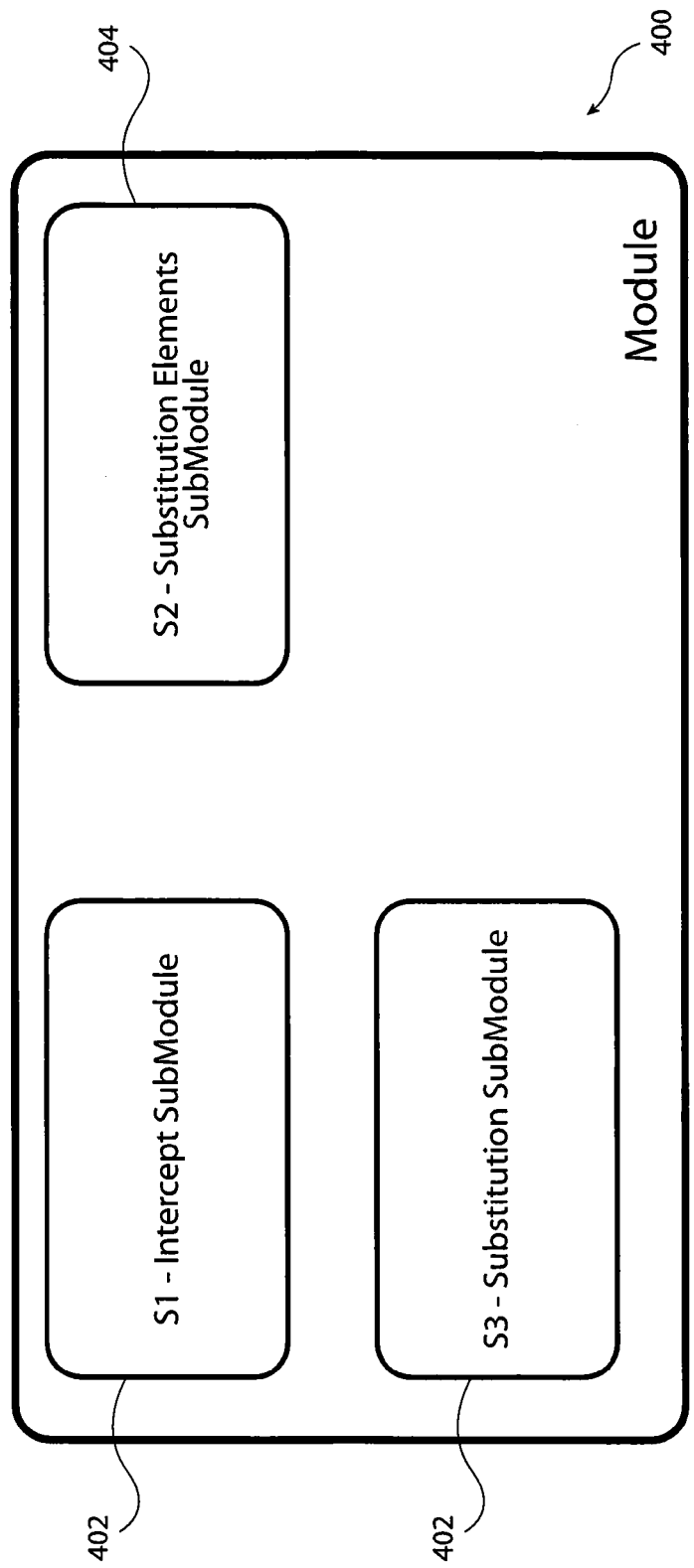
FIG. 4 an overview of the Module of the present invention and sub-modules.

FIG. 4 shows an overview of the Module 400 and sub-modules. In one embodiment, Module 400 comprises various elements (sub-modules), designated S1, S2 and S3. In one embodiment, S1 (Intercept sub-module 402) comprises an intercept sub-module configured to manage the DHCP information between networks. In another embodiment, S2 (Elements sub-module 404) comprises a substitution elements sub-module configured to obtain and establish the network items to be substituted. In one embodiment, this sub-module may be configured to obtain these either statically (e.g., manually configured) or dynamically through pre-fetching from the DHCP server. In another embodiment, remote configuration of the S2 Elements sub-module, via a Remote Module, is described further herein. In yet another embodiment, S3 (Substitution sub-module 406) comprises a substitution sub-module configured to perform the operations of deconstructing, substituting, and rebuilding the packets.

Figure 5:
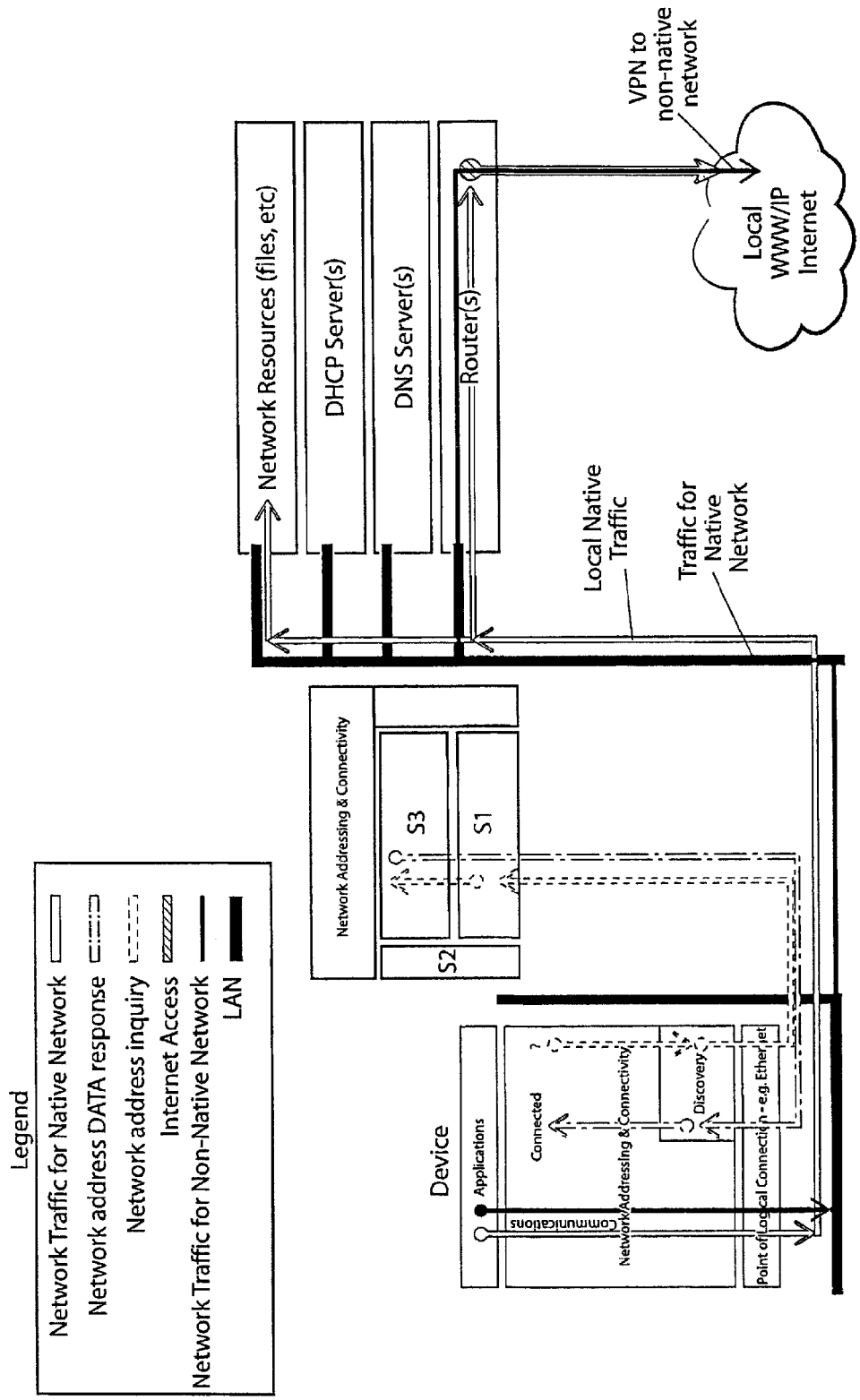
FIG. 5 shows and exemplary overview of one embodiment of the Module of the present invention, the flow of steps and the flow of traffic.

FIG. 5 shows an exemplary Module's configuration elements, and shows the traffic patterns for both the connectivity enquiry and the automatic traffic to both native or non-native resources (See Fig. Legend). The Module's configuration elements contain the substitution elements to be provided to the device. These elements can be pre-configured, automatically learned, or a combination of both, as described further below.

Depending on the implementation and form of distribution, the configuration of the module can be performed in different ways (for example: by setting properties of an embeddable component, by writing or modifying source code, by writing or modifying one or more configuration files, etc). Some or all of the configuration parameters may also be preset in the module, bundled with the module or hard-coded into the module.

In one embodiment, the module resides on a computing device which processes incoming and outgoing network messages as an application, firmware, or software. The module and sub-module assemblies are used at different phases of the communications cycle and operate when those phases are initiated or operated by the network messaging.

Remote Query of Pre-defined Information via Remote Module

Figure 6:
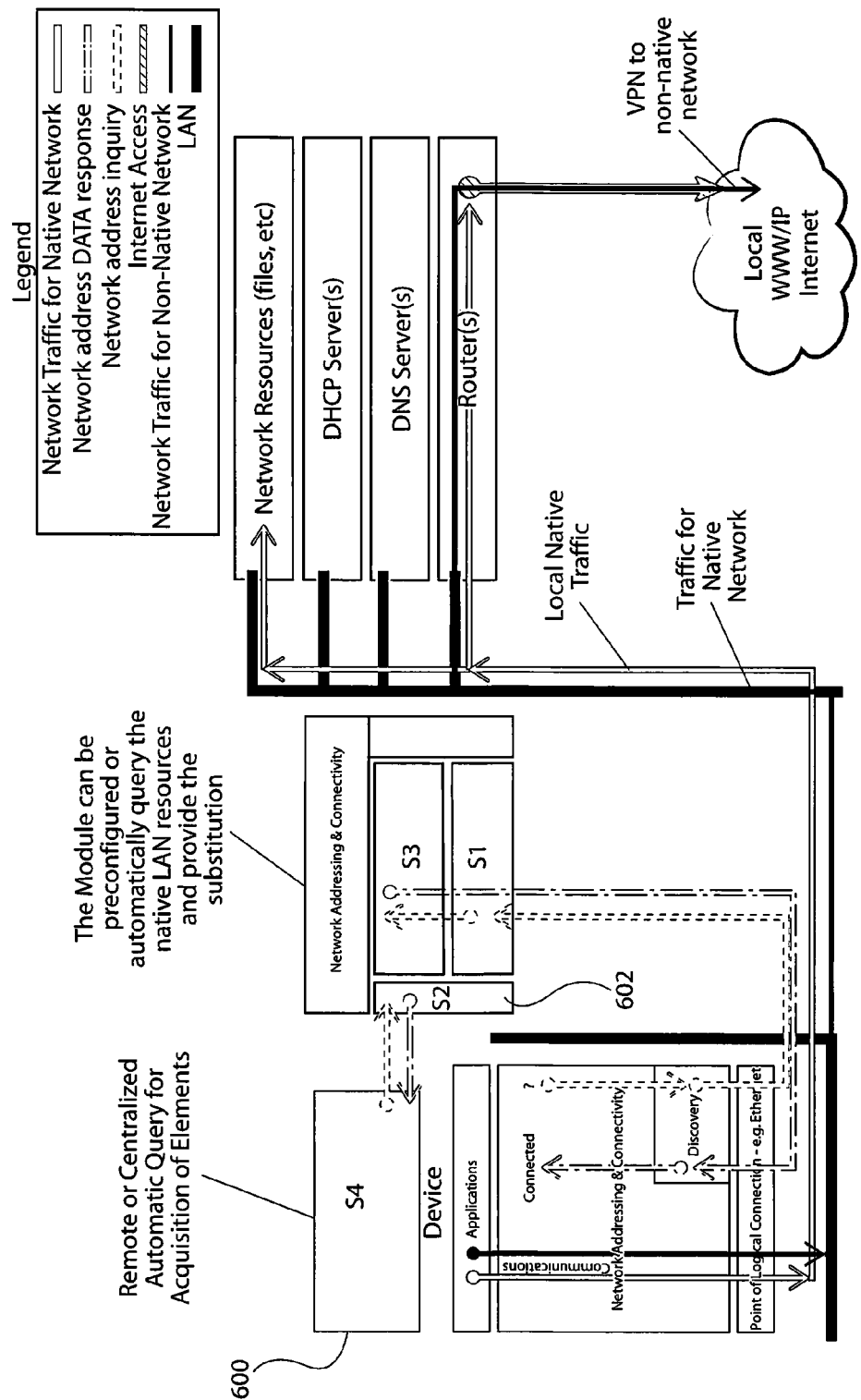
FIG. 6 shows an exemplary overview of network-attached devices operating using one embodiment of the present invention that includes a Remote Module.

In another embodiment, predefined information can be queried in a database for retrieval as needed. This operation is carried out by way of a Remote Module 600, shown as S4 in FIG. 6. The Remote Module 600 provides remote or centralized automatic query for acquisition of elements. Remote Module 600 places information for later retrieval, or query for information it may use for its own operation. In one embodiment, Remote Module 600 uses the Domain Name System (DNS) system TXT data type to create a message based bi-directional communication system.

The DNS system allows for the retrieval of network information in a recursive manner attempting to resolve a queried host name. The DNS request (for any data type) can and will traverse through multiple random servers until it gets to the DNS server that is authoritative for that domain. Once that authoritative DNS server is found it attempt to honor the request with the stored information from its database. Remote Module codes various host names within a domain via a structure and places an associated TXT record also encoded with the desired information. For a remote fielded device to obtain information it is seeking it merely issues a standard DNS TXT record request for a coded-host name full-qualified-domain. The request, if available, will be delivered by the authoritative DNS server back to the querying device. Additionally, the DNS system can be used to create a standard DNS NSUPDATE record to permit the remote addition or modification of data, in real time, from a remote device. The inherent nature of DNS, and its recursion, is a key benefit of the connectionless communications path. The module leverages this to provide a connectionless peer-to-peer or peer-to-many information management front-end.

EXAMPLE

A device in city X configured with a Remote Module S4—with Remote Module in the "on" position.

The device will obtain its public IP address on its main interface (not module specific)

The device will then create a DNS NSUPDATE record to a user specified domain this is example.com—to push the learned knowledge of what it has just learned it's pubic IP.

The update will send the devices Ethernet MAC address plus an pre-pend as the HOST part (pip.xx-xx-xx-xx-xx-xx.example.net) with the INFO text record data as "<publicIP.y.y.y.y>"

Any other device anywhere looking to contact this specific unit can use the same DNS system and simply ask for the INFO record of pip.xx-xx-xx-xx-xx-xx.example.net for which will be returned <publicIP.y.y.y.y>.

An unlimited of host pre-pends and INFO text record formats can used to allow for direct addressing of such things (but not limited to) as DHCP hosts, DHCP gateways, System Uptime Status, Firmware updates, or logging.

Thus, also envisioned in the present invention—by way of Remote Module 600—is a method for indirect connectionless bi-directional messaging over unknown network infrastructures. Where the method communicates with a database without the requirement for direct access to that database for either obtaining or placing information; and where the communications can contain an unlimited amount of discreet and selectable information elements; and where there is no direct acknowledgement of receipt of communications.

In one embodiment, the method codes discreet information elements as host names within a full-qualified-domain-name places an associated TXT record also encoded with the desired information; where remote device to obtain information it is seeking it merely issues a standard DNS TXT record request to any DNS server for a coded-host name full-qualified-domain; where the request will be delivered by the authoritative DNS server back to the querying device thorough one or more DNS servers. In another embodiment, the method can be used to create a standard DNS NSUPDATE record to permit the remote addition or modification of data, in real time, from a remote device.

Alternate Embodiment for Establishing Tunnel to Non-native Network

When a host is installed on the network there are situations where it will desire to communicate directly with another peer across that network. The network infrastructure may not permit this direct communication through a variety of known and/or unknown limitations. Often these limitations are out of the control of the each host's network providers. This situation is particularly difficult when creating a virtual private network (VPN) tunnel between sites as NAT or Firewall gateways are free to make outbound connections but block any ad-hoc in-bound connections.

Figure 7:
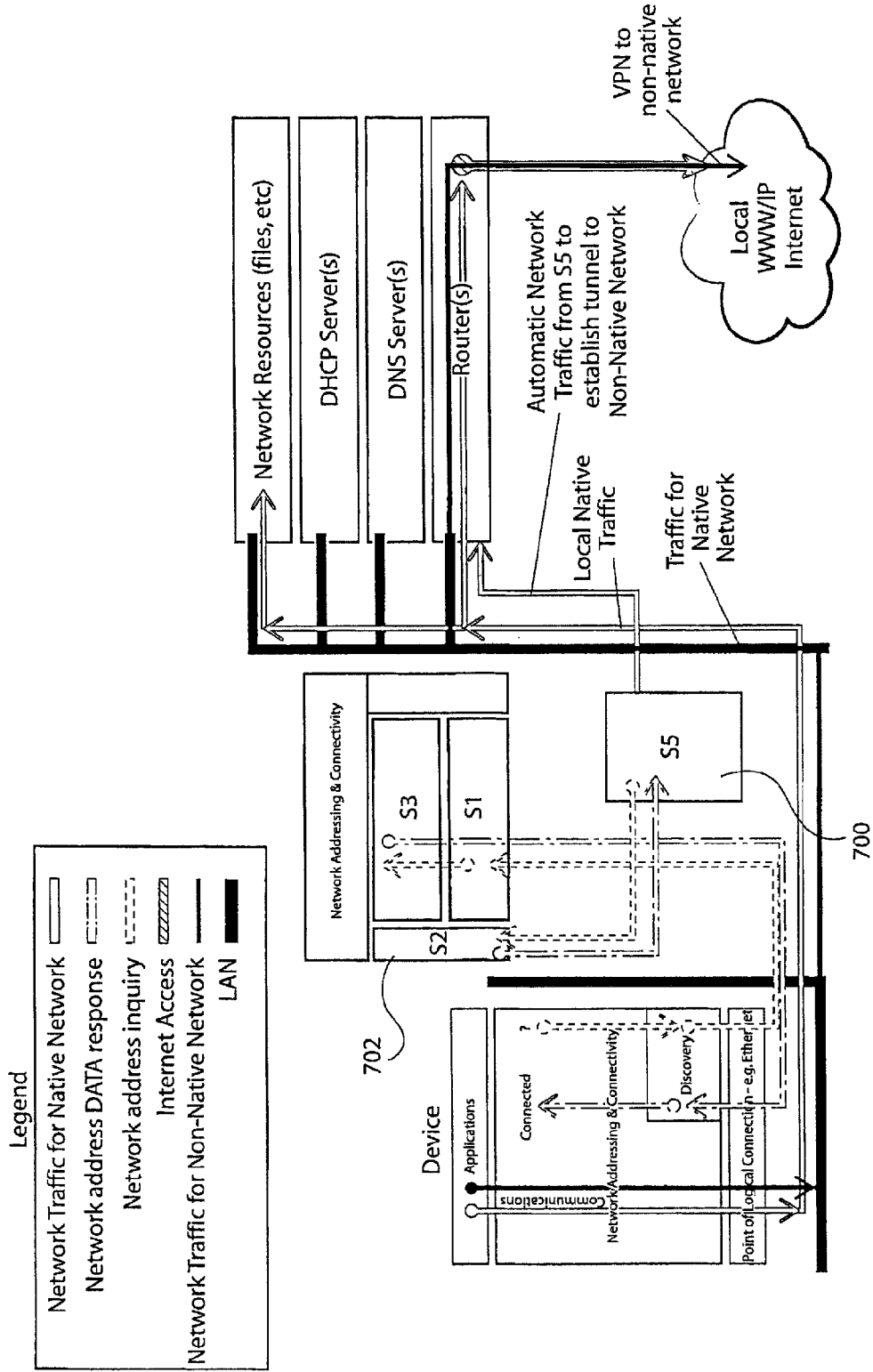
FIG. 7 shows an exemplary overview of network attached devices operating using one embodiment of the present invention that includes a Direct Tunnel Module.

Thus, also envisioned in the present invention is a Direct Tunnel Module 700, shown as S5 in FIG. 7, The Direct Tunnel Module 700 permits one or more network devices to automatically discover capabilities for communications directly between associated end-points across one or more unknown networks even if both end points are behind a NAT or Firewall. It is important to note that Remote Module 700 does not require a relay or a special protocol for tunneling and can be used with standard or proprietary tunneling methods. When two VPN network device wish to establish a direct peer-to-peer connection for the purpose of tunnel connectivity it is necessary that one endpoint receives the initial setup request from end-point towards its peer-endpoint. Often this is referred as client and server communications with the initiating device is the client and the receiving device is the server.

Most networks operate with a Network Address Translator (NAT) and create a private IP address network for its hosts. For an endpoint initiating an outbound network connection, meaning the message traverses the private network toward the public IP through the NAT, communications are unimpeded. When a public-to-private connection is to be initially established a NAT router will block this connection as it does not recognize the connection or which host on the private network it should send it to.

In one embodiment, when Direct Tunnel Module 700 is operating within two separate peer-devices, each device will initially and individually contact an offsite management server that can proxy the information between the two end-points. They will exchange capabilities and information and begin a sequence of agreed upon outbound connections. The endpoint with the lower Ethernet MAC address will become the server with its peer the client. Each device will establish a sequence connection towards each other until one connection is discovered sufficient to establish direct endpoint-to-endpoint connectivity. At this point, the VPN or Tunnel can be initiated with the underlying networking transport already established.

In another embodiment, Direct Tunnel Module 700 facilitates the automatic creation of bi-directional direct peer-to-peer network connections through Internet Protocol based network address translators. In yet another embodiment, Module 700 provides a method that permits one or more devices to automatically discover capabilities for communications directly between associated end-points across one or more unknown networks even if both end points are behind a NAT or Firewall, wherein the method does not require a server or relay function outside of each device network or a special protocol for the creation of a VPN, tunneling, or any other application. Module 700 is further configured so that each device will generate identity communications to a separate database; and each device will create multiple outbound communications sessions; and each device will report to the separate database the status and information of the initiated sessions; and each device will attempt connections on all of the sessions. A successful connection response will generate a handoff in each device to the requesting application.

Reference herein to "example", "embodiments" or similar formulations means that a particular feature, structure, operation or characteristic described in connection with the example, is included in at least one implementation in this description. Thus, the appearance of such phrases or formulations herein is not necessarily all referring to the same example. Further, various particular features, structures, operations or characteristics may be combined in any suitable manner in one or more examples, and or embodiments.

What is claimed is:

1. A method for permitting split-routing of network traffic to occur without any changes, modifications or configuration of a requesting host, network stack, network architecture, and routing and forwarding behavior, the method comprising:

presenting a module residing on a local area network, the module comprising an intercept sub-module, a substitutions sub-module, and a substitutions elements sub-module configured with one or more pre-defined elements, wherein pre-defined elements comprise one or more of a default gateway address of the responding server and a local gateway address associated with a local area network and wherein the module is configured for substituting an IP address of an issuing DHCP server with an IP address of a local terminal and the substitutions elements sub-module is configured to perform the operations of deconstructing, substituting and rebuilding packets of DHCP communications;

intercepting, by the intercept module, a DHCP communication between a requesting device and a DHCP server;

substituting, by the substitutions sub-module, a network addressing element of the server with the one or more pre-defined elements of the substitutions elements sub-module in the server response;

forwarding the communication containing the substituted element to the requesting device, thereby facilitating a split tunnel; and providing egress of traffic, wherein traffic is not local to the local area network thereby directing traffic through an alternate route and wherein only traffic destined for a native network will traverse the tunnel.

2. The method of claim 1, wherein the substitutions elements sub-module is configured to obtain and establish the network addressing elements to be substituted.

3. The sub-module of claim 2, wherein the sub-module is configured to obtain substitution items statically, manually or dynamically.

4. The method of claim 1, wherein the module is configured for forwarding traffic from a local terminal to a predetermined interface based on a destination of that address.

5. A non-transitory computer-readable medium having recorded thereon a program that causes a device to execute a method for enabling substituting network addressing elements, the method comprising:

presenting a module residing on a local area network, the module comprising an intercept sub-module, a substitutions sub-module, and a substitutions elements sub-module configured with one or more pre-defined elements, wherein pre-defined elements comprise one or more of a default gateway address of the responding server and a local gateway address associated with a local area network and wherein the module is configured for substituting an IP address of an issuing DHCP server with an IP address of a local terminal and the substitutions elements sub-module is configured to perform the operations of deconstructing, substituting and rebuilding packets of DHCP communications;

intercepting, by the intercept module, a DHCP communication between a requesting device and a DHCP server;

substituting, by the substitutions sub-module, a network addressing element of the server with the one or more pre-defined elements of the substitutions elements sub-module in the server response;

forwarding the communication containing the substituted element to the requesting device, thereby facilitating a split tunnel; and providing egress of traffic, wherein traffic is not local to the local area network, thereby directing traffic through an alternate route and wherein only traffic destined for a native network will traverse the tunnel.

* * * * *